United States Patent Office.

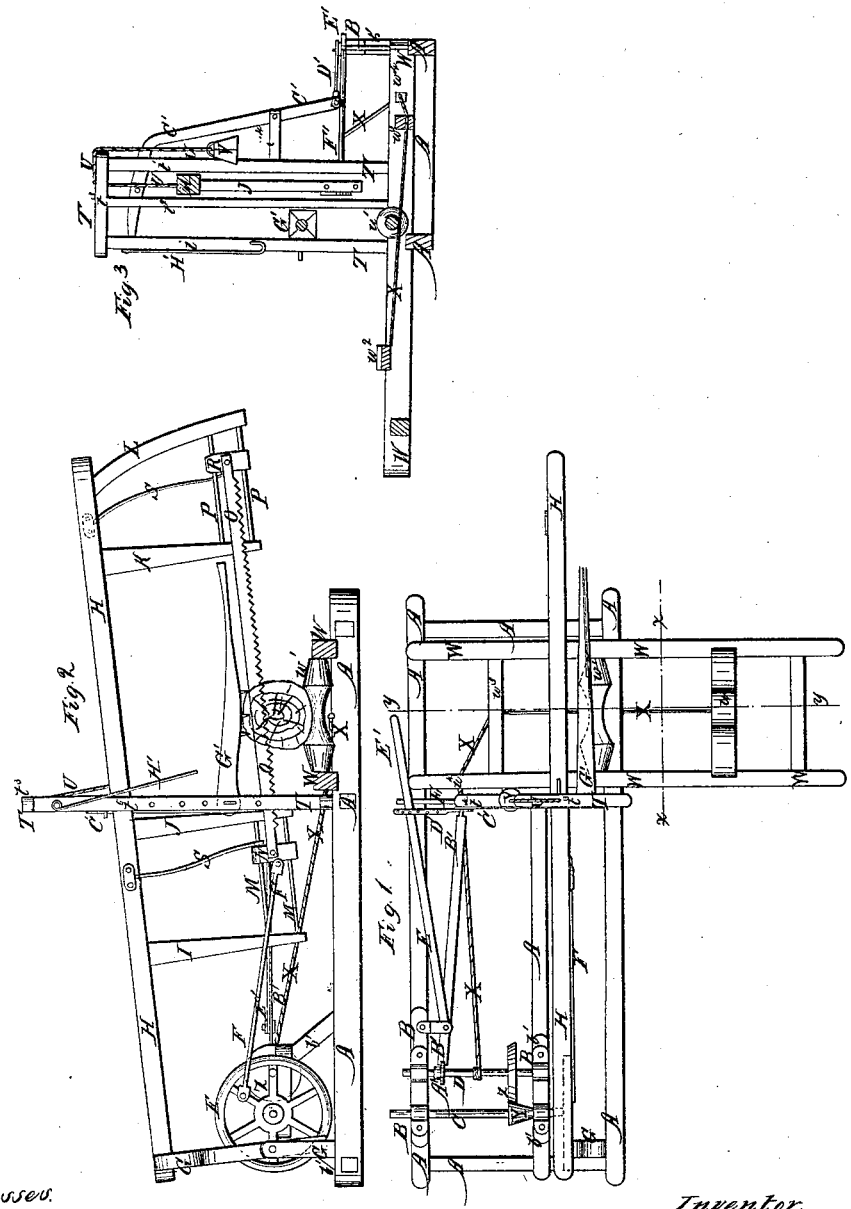

IMPROVEMENT IN SAWING MACHINES.

EDWIN HARD, OF CANAL DOVER, OHIO.

Letters Patent No. 60,628, dated December 18, 1866.

---

The Schedule referred to in these Letters Patent and making part of the same.

---

TO ALL WHOM IT MAY CONCERN:

Be it known that I, EDWIN HARD, of Canal Dover, in the county of Tuscarawas, and State of Ohio, have invented a new and useful Improvement in Cross-Cut Sawing Machine; and I do hereby declare that the following is a full, clear, and exact description thereof, which will enable others skilled in the art to make and use the same, reference being had to the accompanying drawings, forming part of this specification, in which—

Figure 1 is a top view of my improved sawing machine.

Figure 2 is a side view of the same, partly in section through the line $x$ $x$, fig. 1.

Figure 3 is a vertical section of the same, taken through the line $y$ $y$, fig. 1.

Similar letters of reference indicate like parts.

My invention has for its object to furnish a cross-cut sawing machine, so improved in construction that its operation may be more effective, convenient, and satisfactory; and it consists, first, in the combination of the frame that supports the shafts with the shafts and with the ground frame of the machine; second, in the combination of a lever, constructed as described, with the upright frame of the machine; third, in the combination of the saw-beam, having downwardly projecting arms and a jointed supporting post, with the ground and upright frames of the machine; fourth, in the combination of the saw boxes, steel springs, and friction rods, with each other, with the downwardly projecting arms of the saw-beam, and with the saw; fifth, in the combination of the levers, adjustable gauge rod, clutch, and bevel-faced pulleys with each other, and with the frames and shafts of the machine; sixth, in the combination of a weight and rope with the saw-beam, and with the upright frame of the machine; the whole being constructed and arranged as hereinafter more fully described.

A is the ground frame, to which the other parts of the machine are attached. B is the frame that supports the shafts C and D. This frame is sustained by short knees or supports, $b^1$, the lower ends of which are attached to the ground frame A. C is the driving-shaft, which revolves in bearings upon the frame B, and to the end of which any desired power for driving the machine may be attached. E is a crank-wheel, attached to the end of the shaft C, to the side of which is pivoted the end of the pitman, F, that operates the saw. G is the post that supports the saw-beam H. The lower end of this post is attached to the ground frame A, and its upper end is slightly bent over, so as to bring the saw-beam H directly over the crank-wheel E. The post, G, is jointed at or near the horizontal plane of the driving-shaft C, as shown in fig. 2, so that the friction rods upon which the saw-boxes slide need not be much longer than the stroke of the saw. I J and K L are downwardly projecting arms, the upper ends of which are securely attached to the saw-beam H. M are two friction rods, the ends of which are attached to the lower ends of the arms I J, and upon which slides the box N, to which the end of the saw O is attached. P are two friction rods attached to the lower ends of the arms K L, and upon which slides the box R, to which the other end of the saw O is attached. S are steel springs, the upper ends of which are attached to the saw-beam H, and their lower ends rest against the inner sides of the boxes N and R to keep the saw O strained, and render its motion equable. The end of the pitman F is pivoted to the box N to operate the saw O. T is the upright frame of the machine, the lower end of which is secured to the ground frame A. The saw-beam H passes between the uprights $t^1$ and $t^2$ of the frame T, which hold the said beam so that the saw may always move in the same line. U is a rope, one end of which is attached to the saw-beam H; it passes thence up through the cross-piece $t^3$ of the frame T, down over the end of said cross-piece, and to its end is attached a weight, V, to assist in raising the said beam and saw when required. At the points where the rope U comes in contact with the cross-piece $t^3$, pulleys may be applied to relieve the friction. W is the log-carriage, which supports the log while being sawn, and which is secured to the ground frame A. $w^1$ is a roller pivoted to the side timbers of the carriage W, upon which the forward end of the log rests while being sawn, and which by its revolution enables the log to be moved forward easily to the saw. $w^2$ is a sliding-block which supports the rear end of the log. X is a rope, the end of which is attached to the sliding-block $w^2$; thence it passes through a hole in the cross-timber $w^3$, through a hole in the side-timber $w^4$, and its end is attached to the shaft D. The shaft D revolves in bearings upon the frame B, and is so formed that it may be moved back and forth longitudinally in said bearings. Y and Z are bevel-faced pulleys attached to the shafts C and D in such a way that when the shaft D is moved longitudinally in one direction the bevel faces of said pulleys will come in contact with each other, and the shaft D be made to revolve. And when the shaft D is moved in the other direction they will be separated from each other, and the motion of the said shaft D will cease. A' is a clutch-wheel, attached to the shaft D, the rim of which enters a notch formed in the end of the lever B'. The lever B' is pivoted to the frame B, and its forward end passes through a slot in the end of the lever C', and of the adjusting bar D'. E' is the gauge rod, the rear end of which is pivoted to the frame B at the same point with the lever B'; thence it passes forward, and its forward end rests upon and extends beyond the rail F', attached to the frame of the machine to support said gauge rod. The gauge rod E' is connected to the adjusting bar D' by a pin which passes through a hole in the said rod E', and one or the other of the holes through the bar D'. The lever C' is pivoted to the arm $t^4$, projecting from the upright frame T. G' is a lever, the end of which is pivoted between the uprights $t^2$ and $t^3$ of the frame T, at a greater or less distance above the carriage W, according as the log to be sawn is of greater or less diameter. To the lower edge of the lever G', that comes in contact with the log to be held, are attached teeth which enter the said log and hold it steadily. H' is a swinging hook pivoted to the side of the upright, $t^5$, of the frame T, and extending down into such a position that it can receive the lever G and hold it away from the log while said log is being drawn forward.

In using the machine the gauge rod E' is adjusted at the proper distance from the saw O. The saw-beam H and lever G' are then raised, the log rolled upon the carriage W, and the machine started. By operating the lever C' the pulleys Z and Y are brought into contact with each other, which revolves the shaft D, winds up the rope X, and draws the sliding-block $w^2$ and the log forward. As soon as the forward end of the log strikes the gauge rod E', it operates the lever B' and separates the pulleys Z and Y, leaving the log in the proper position to be sawn. The lever G' and saw-beam H are then lowered and the cut made, the log being thus moved forward by the action of the machine itself, and without stopping the motion.

What I claim as new, and desire to secure by Letters Patent, is—

Operating the saw-carriage by means of the bevel pulleys Y Z, clutch A', lever B', curved lever C', adjusting bar D', and gauge rod E', arranged and operating substantially as described for the purpose specified.

EDWIN HARD.

Witnesses:
GEORGE IRT,
C. B. NEUBOLD.